Oct. 10, 1939.    J. A. GINTLING    2,175,772
LEFT-FOOT ACCELERATOR FOR AUTOMOBILES
Filed June 10, 1938

Inventor:
John A. Gintling
By Chapman & Ferguson
Attorney.

Patented Oct. 10, 1939

2,175,772

UNITED STATES PATENT OFFICE 2,175,772

LEFT-FOOT ACCELERATOR FOR AUTOMOBILES

John A. Gintling, Baltimore, Md.

Application June 10, 1938, Serial No. 213,029

1 Claim. (Cl. 74—513)

This invention relates to improvements in accelerator mechanisms for automobiles and has for its object to provide an accelerator adapted to be operated by the left foot.

The invention consists of the novel construction and arrangement of the parts and combination of parts hereinafter more fully set forth in the following specification and pointed out in detail in the appended claim.

Figure 1:
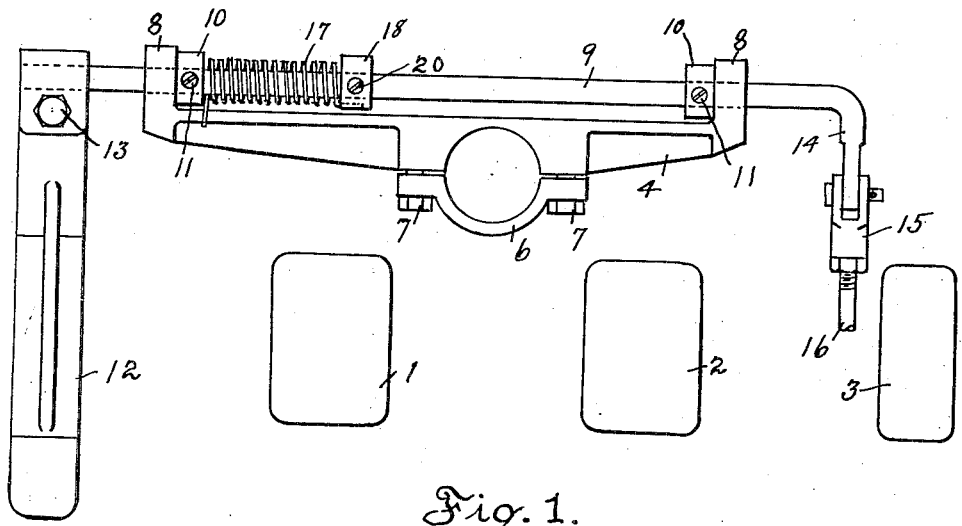
Figure 1 is a plan view of my invention.
Figure 2:
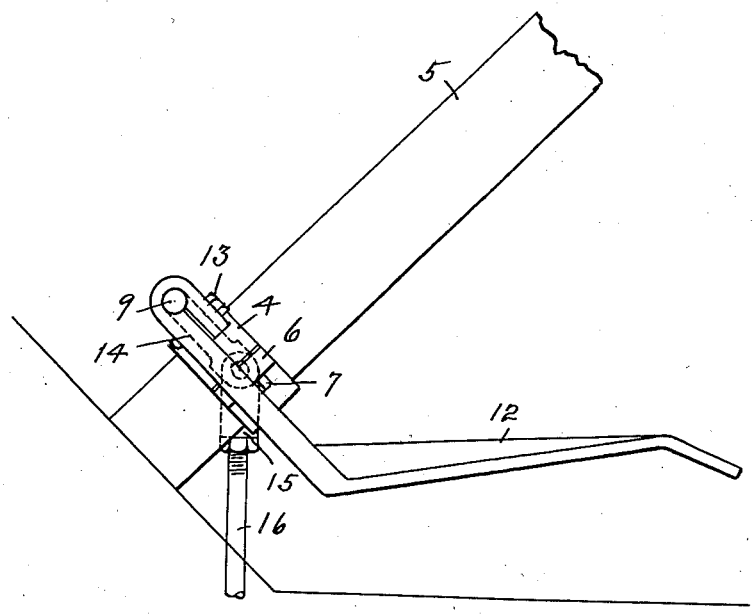
Figure 2 is a side elevation of Figure 1 showing the invention connected to the steering column of an automobile.

Referring to the accompanying drawing, forming part of this specification, and in which like reference numerals designate like parts throughout the several views thereof, 1 designates the clutch pedal, 2 the brake pedal, and 3 the accelerator pedal in general use on all automobiles, the pedal 3 being the usual pedal operated by the right foot. A bracket 4 is secured to the steering column 5 and is held thereto by the clamp 6 and bolts 7. The bracket 4 is provided with a projection 8 on each end thereof, each of which is provided with an aperture through which the rod 9 projects. The said rod 9 is provided with a collar 10 adjacent to each of said projections 8 to hold the rod in the proper position in said bracket 4. The collars 10 are secured to the rod 9 by the set-screws 11. On one end of the rod 9 is a pedal 12 having its end bent over said rod and clamped in position by the bolt 13. The opposite end of the rod is bent at 14 and is provided with a clevis 15 having a rod 16 projecting therefrom which extends through the floor of the automobile and is adapted to connect with the usual accelerator rod. The pedal 12 is operated by the left foot which leaves the right foot of the operator free to operate the brake pedal 2, when in traffic, or in case the right foot becomes tired from a long drive. The rod 9 is provided with a coiled spring 17 having one end resting against the bracket 4 and the opposite end projecting into the collar 18 on the rod 9. This spring 17 holds the pedal 12 in position against rattling. The tension of the spring 17 can be regulated by turning the collar 18 which latter is held to the rod 9 by the screw 20.

Having thus described my invention, what I claim is:

A left-foot accelerator for automobiles, comprising a bracket having projections at each end thereof and adapted to be secured to the steering column of an automobile, a rod mounted in said projections of said bracket and having one end bent at an angle thereto and adapted to be connected to the accelerator rod of an automobile, a pedal on the opposite end of said rod, collars to hold the rod in position in said bracket, a collar adjustable on said rod between the aforesaid collars, and a coiled spring on said rod having one end resting against the said bracket and its opposite end projecting into the last-named collar to hold the pedal against vibration.

JOHN A. GINTLING.